No. 883,233. PATENTED MAR. 31, 1908.
S. B. POWERS.
AUTOMATIC SEED CABINET.
APPLICATION FILED JAN. 10, 1908.
2 SHEETS—SHEET 1.
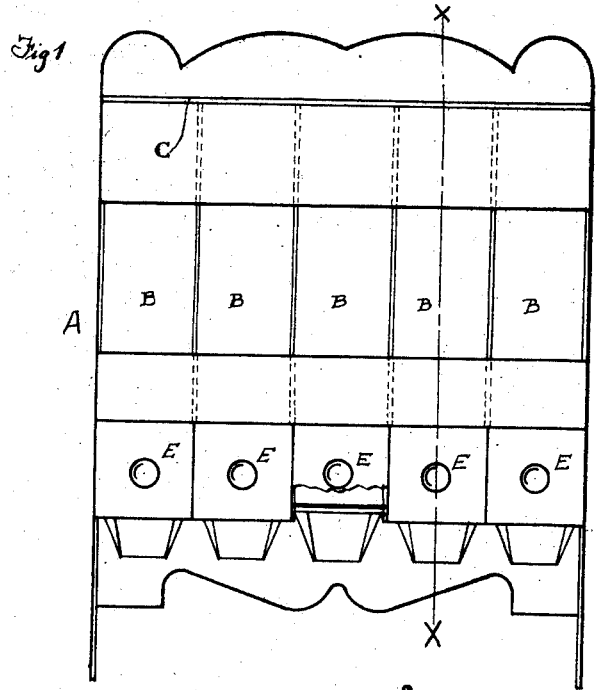
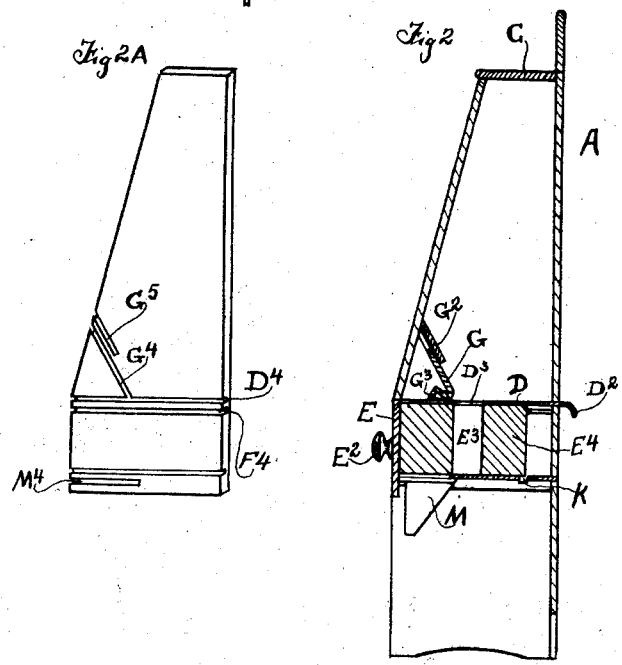
WITNESSES:
Fred G. Haas.
May C. Haas.
INVENTOR.
Scott B. Powers,
BY
S. A. Haseltine,
ATTORNEY.

No. 883,233. PATENTED MAR. 31, 1908.
S. B. POWERS.
AUTOMATIC SEED CABINET.
APPLICATION FILED JAN. 10, 1908.
2 SHEETS—SHEET 2.
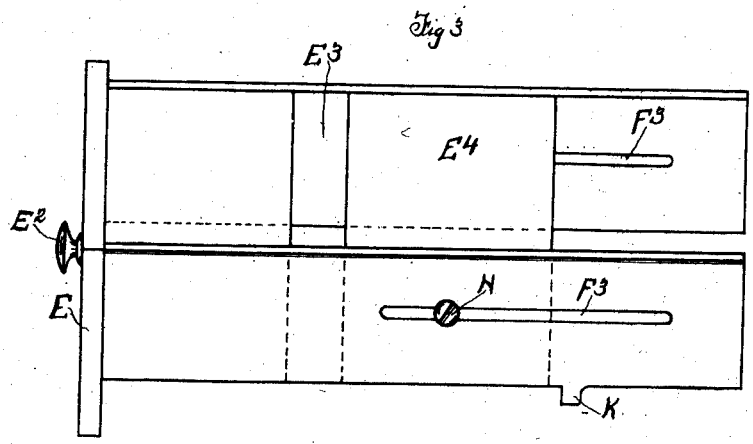
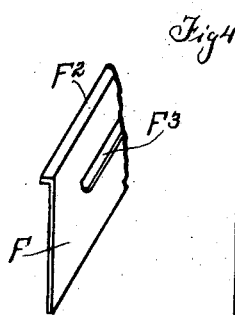
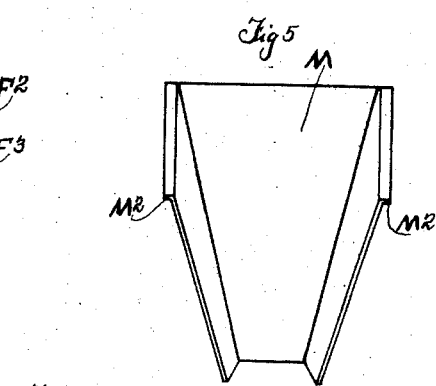
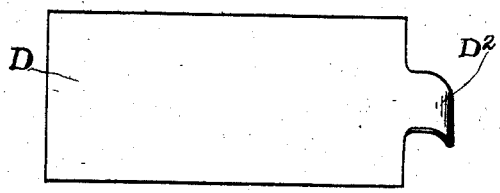
WITNESSES:
Fred G. Haas
May C. Haas
INVENTOR.
Scott B. Powers,
BY
S. A. Haseltine,
ATTORNEY.

UNITED STATES PATENT OFFICE.

SCOTT B. POWERS, OF SPRINGFIELD, MISSOURI.

AUTOMATIC SEED-CABINET.

No. 883,233.     Specification of Letters Patent.     Patented March 31, 1908.

Application filed January 10, 1908. Serial No. 410,181.

*To all whom it may concern:*

Be it known that I, SCOTT B. POWERS, a citizen of the United States, residing at Springfield, in the county of Greene and State of Missouri, have invented certain new and useful Improvements in Automatic Seed-Cabinets, of which the following is a specification.

My invention relates to improvements in automatic seed cabinets, the object of which is to provide a cheap, simple, durable and convenient device for holding and accurately measuring a given quantity of seeds so the same can be sold in bulk giving any desired quantity as the slide is drawn from the cabinet forward. These objects I attain by means of the device illustrated in the accompanying drawings forming a part of this specification in which.

Figure 1, is a front view of the entire device with a part cut away to show the spout. Fig. 2, is a vertical section on the line XX of Fig. 1. Fig. 2$^A$, is a detailed view showing the groove in the partitions. Fig. 3, is a view in elevation of one of the slides or drawers. Fig. 4, shows the side pieces of the slide or drawer removed. Fig. 5, is a view of one of the spouts removed. Fig. 6, is a view of the V shaped scraper removed. Fig. 7, is a view of the bottom of the receptacle showing the handle for removing the same.

Similar letters indicate corresponding parts in the several figures.

A, represents a cabinet for holding the seeds made into any desired number of compartments B. This cabinet has suitable hinged cover C, for permitting the seeds to be placed in the different compartments of the cabinet. The bottom of each of the said compartments is provided with a suitable slide D, having a handle $D^2$ at the back of the cabinet for adjusting the hole $D^3$ in the bottom of the compartment which permits the seeds to go down into the drawer or slide E. This is done by drawing the bottom slide D, by means of the handle $D^2$, back and forth as desired.

The V shaped scraper G, is placed in grooves $G^4$ on the sides of the compartments so as to be adjusted up and down for different size seeds as may be required and for this purpose a projection $G^2$, extends down from the upper side to prevent the seeds from getting in behind the scraper at the upper end, the lower end $G^3$, being made V shape and of tin or any suitable material so as not to cut the seeds while scraping them or stroking them off from the slide or drawer below and thus giving to the slide or drawer below a stroke measure. The slide or bottom D, can be entirely removed when desired to empty one of the compartments for cleaning or changing the seeds or other purposes.

The slide or drawer E, consists of a front part having a handle $E^2$, and an opening $E^3$. The opening $E^3$, can be made any desired size or adjusted in size to measure the desired quantity of seed to be drawn from the cabinet by operating the drawer or slide E. The opening $E^3$, is arranged so as to be directly below the opening $D^3$, in the bottom of the compartment when the drawer or slide is back in position so that the seeds in the cabinet will pass through the opening $D^3$, in the bottom of the cabinet and fill the space $E^3$ in the drawer or slide. This opening $E^3$ is adjusted in size by any suitable means. I prefer using a block $E^4$, back of the opening provided with a set screw H, passing through slots $F^3$ in the side pieces F, of the drawer or slide E. These side pieces F, are bent to form projections $F^2$, which operate or slide back and forth in suitable grooves $F^4$ in the sides of the compartments and by means of the slots $F^3$, and the set screw H, the compartment or opening $E^3$, can be adjusted to any desired size. As the drawer or slide E, is drawn forward it is provided with a suitable cleat or stop projection K, to prevent the drawer or slide from going further forward than desired to empty the seeds from the opening in the slide or drawer $E^3$ into the spout M. The spout M, is provided with projections $M^2$, on each side for fitting in grooves $M^4$ on the sides of the compartment. This spout is made any desired size and shape for conducting the seeds into the bag or receptacle below. This cabinet can also be used for holding and measuring spices, shot and other commodities.

Having thus described my invention what I claim as new and desire to secure by Letters Patent of the United States is.

In a device of the character described, the combination with a cabinet of a drawer slidably disposed therein, said drawer comprising a front member and side members carried by said front member, a fixed block at the front end of and completely filling said drawer, a block slidably mounted in said drawer, set screws carried by said block which pass through slots formed in the side members of said drawer, a spout into which said drawer discharges when at its foremost limit of movement, means for limiting the forward movement of said drawer, a slide overlying said drawer and controllable from the exterior of the cabinet, there being an opening formed through said slide, and a scraper adjustably mounted in groove of the cabinet, said scraper comprising an inclined body portion and a V-shaped portion carried thereby.

In testimony whereof I affix my signature, in presence of two witnesses.

SCOTT B. POWERS.

Witnesses:
S. A. HASELTINE,
ROBT. L. SECREST.